United States Patent [19]

Evens et al.

[11] 3,918,972

[45] Nov. 11, 1975

[54] IMAGING PROCESS UTILIZING A POLYESTER POLYCONDENSATE CONTAINING SPIROPYRAN PHOTOCHROMIC GROUPS

[75] Inventors: Georges Gerard Evens, Leuven; Georges Joseph Smets, Heverlee, both of Belgium

[73] Assignee: Agfa-Gevaert N.V., Mortsel, Belgium

[22] Filed: Aug. 13, 1973

[21] Appl. No.: 387,805

[30] Foreign Application Priority Data
Aug. 24, 1972 United Kingdom............ 39603/72

[52] U.S. Cl............ 96/48 R; 96/90 PC; 260/240 R; 96/115 R
[51] Int. Cl.²........................................ G03C 5/24
[58] Field of Search..... 260/240 R; 96/90 PC, 48 R, 96/115 R; 252/300

[56] References Cited
UNITED STATES PATENTS

| 3,652,285 | 3/1972 | Delzenne et al. | 96/48 |
| 3,696,098 | 10/1972 | Hoefnagels et al. | 96/90 R |

*Primary Examiner*—Won H. Louie, Jr.
*Attorney, Agent, or Firm*—A. W. Breiner

[57] ABSTRACT

Linear photochrome polycondensates of the polyester type are described which contain spiropyran photochromic groups as an integral part of the main polymer chain, have a glass transition temperature lower than 120°C and possess photochromic properties at or above their glass transition temperature.

Manufacture of stabilized photochromic images by exposing a layer of the photochromic polycondensate at a temperature at least equal to the glass transition temperature of the photochromic polycondensate and immediately cooling the thus exposed layer below the glass transition temperature.

8 Claims, No Drawings

IMAGING PROCESS UTILIZING A POLYESTER POLYCONDENSATE CONTAINING SPIROPYRAN PHOTOCHROMIC GROUPS

This invention relates to photochromic polycondensates, their preparation, to the stabilisation of photographic images formed upon exposure to actinic light in a layer of these photochromic polycondensates and to the stabilized photographic images so obtained.

It is known that photochromic compounds in general undergo reversible colour changes in such a way that they get coloured or change colour under the influence of light of certain wavelengths, whereas on irradiation with light of other wavelengths or with heat, they revert to the colourless state or to the original colour. Although more slowly the colour generally also fades away in the dark.

At the Pure and Applied Chemistry, Polymer Symposium, held in Bratislava, June 1971, G. Smets described a photochromic copolyester wherein the photochromic moiety of the spiropyran type forms an integral part of the main polymer chain. It was obtained by the reaction of a photochromic compound of the spiropyran type carrying two hydroxymethyl groups with an excess of a mixture of iso- and terephthaloyl chloride followed by reaction of the photochromic diacid chloride thus formed with 2,2-bis(4-hydroxyphenyl)-propane (=Bisphenol-A). On account of its polyester content this copolyester could be coated easily from its dichloromethane solution to form a film. When completely dry, however, these films exhibit practically no photochromic behaviour at normal temperatures. Only upon heating above the glass transition temperature (approximatively 194°C) they become thermochrome. No photochromic effect can be observed at this temperature. In contrast therewith, swelling in the presence of dichloromethane vapours at normal temperatures is already sufficient to restore their reversible photochromism and their complete recovery.

In view of the above, it was interesting to investigate the influence of the glass transition temperature upon the photochromic behaviour of other photochromic polycondensates, in which also the photochromic moiety forms an integral part of the main polymer chain. Since the glass transition temperature of the photochromic copolyester described in Bratislava was relatively high as a result of the presence therein of the aromatic groups deriving from iso- and terephthalic acid so that also thermochromism occurred at that temperature, other copolycondensates were manufactured wherein i.a. aliphatic di-acids were used in the polycondensation reaction, the glass transition temperature being lower than about 110°-120°C, in order to avoid that the photochromic image produced upon irradiation at the glass transition temperature might be obscured by thermochromism of the photochromic polycondensates at that temperature.

It is an object of the invention to produce linear polycondensates of the polyester type wherein the photochromic moiety of the spiropyran type forms an integral part of the main polymer chain, these polycondensates having a glass transition temperature beneath approximatively 120°C and being photochromic at or slightly above the glass transition temperature.

It is another object of the invention to produce photochromic polycondensates of the polyester type wherein the transient colour brought about in these photochromic polycondensates by irradiation at or slightly above the glass transition temperature is not obscured by thermochromism of the photochromic polycondensates at that temperature. A further object is a process wherein the photochromic image formed upon irradiation in a layer of the photochromic polycondensate is greatly stabilized so that a more permanent image is obtained.

According to the invention linear polycondensates of the polyester type are provided characterized in that they contain spiropyran photochromic groups as an integral part of the main polymer chain, have a glass transition temperature lower than 120°C and possess photochromic properties at or above their glass transition temperature.

They can be prepared by polycondensation of Bisphenol-A and a photochromic compound carrying a hydroxyalkyl group on either side of the photochromic moiety, with a dicarboxylic acid of the saturated dicarboxylic acid series, preferably with succinic acid, adipic acid, glutaric acid and pimelic acid. These copoly-condensation reactions can be carried out very conveniently according to the interface polycondensation process described in our United Kingdom patent specification No. 891,781. In this process the dicarboxylic acid in the form of a diacid dichloride is dissolved in an organic liquid, such as methylene chloride, dichloroethane, tetrachloroethane, benzene or toluene, which is also a solvent for the copolycondensate to be formed. The bisphenol is dissolved in another liquid, which is immiscible with the above organic liquid. Preferably water is used as solvent for the bisphenol and an equivalent amount of a metal hydroxide, such as sodium hydroxide or potassium hydroxide is added to the water in order to form immediately the corresponding diphenolate. The reaction speed is greatly increased by using quaternary ammonium compounds as catalysts. The two solutions are mixed and stirred vigorously at the reaction temperature, whereby the copolyester is formed in solution.

In the same way the photochromic copoly-condensates of the invention are formed. Very conveniently a photochromic compound carrying on either side of the photochromic moiety an hydroxyalkyl group is made to react with an excess of the diacid dichloride e.g. of succinic acid, adipic acid, glutaric acid, or pimelic acid, and the photochrome-bis-acid chloride formed in this way is made to react in a two-phase reaction mixture with a diphenolate of Bisphenol-A.

Suitable photochromic compounds carrying two hydroxyalkyl groups on either side of the photochromic moiety are compounds, containing spiropyran groups, e.g. compounds of the formulae:

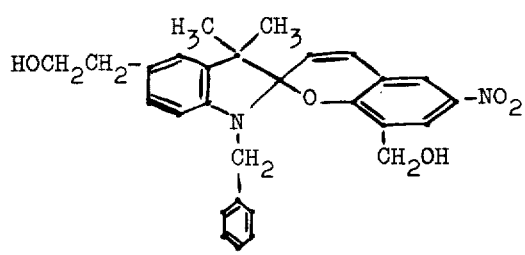

Continued

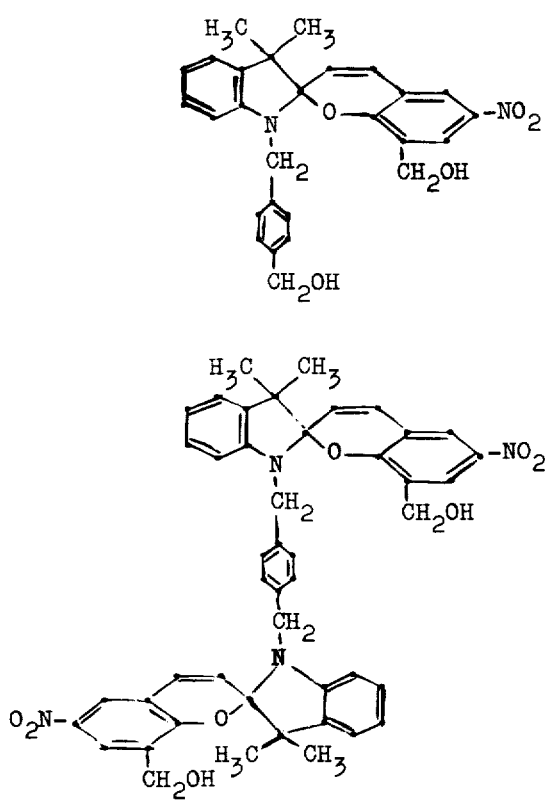

Although the photochromic polycondensates of the invention are restricted to polycondensates of the polyester type, very interesting photochromic polycondensates may also be formed by replacing in the above indicated reactions the Bisphenol-A partly or wholly by an aliphatic diamine or by piperazine.

As a result of the presence in the polycondensate chain of aliphatic chain elements deriving from aliphatic diacids or aliphatic diamines, the mobility of the chain elements is greatly enhanced and the glass transition temperature of these photochromic polycondensates is much lower than would be the case if the aliphatic di-acid groups would have been replaced by aromatic counterparts deriving e.g. from iso- and terephthalic acid. Their glass transition temperature is lower than about 120°C and in some combinations even as low as 50°C.

The above photochromic polycondensates, in solution or in the form of a layer, which is applied from that solution, can be exposed to actinic light rays. It was completely unexpected that, when such an exposure of a dried photochromic layer occurred at a temperature corresponding with the glass transition temperature of the photochromic polycondensate or slightly above that temperature, the polycondensate got coloured or changed colour in the exposed areas. At the same time, since their glass transition temperature is relatively low, no thermochromism at all occurred at these temperatures. Moreover, when the photochromic polycondensate after exposure to light and colouration, was immediately cooled below the glass transition temperature, the colour in the exposed areas was stabilized. This means that the colour did no longer fade away when exposed to actinic light rays of other wavelengths, and also that the colour brought about by the exposure, did no longer fade away in the dark.

This procedure can be used in a photographic process which is also within the scope of the present invention.

According to the invention there is also provided a process for the stabilization of photochromic images, which process comprises the steps of:

1. providing a photographic element having a layer or stratum comprising a photochromic polycondensate of the polyester type having a glass transition temperature below 120°C, and wherein the photochromic moiety is an integral part of the main polymer chain,
2. image-wise exposing said photographic element to actinic light at a temperature at least equal to the glass transition temperature of said photochromic polycondensate so as to effect colouration of said photochromic polycondensate in the exposed areas, and
3. immediately cooling the thus exposed photographic element to a temperature below the glass transition temperature of said photochromic polycondensate so as to stabilize the colouration formed in the exposed areas.

The photochromic polycondensates of the invention can be applied from solution in an organic solvent to any support, the solvent being in general an halogenated hydrocarbon such as methylene chloride, dichloroethane and tetrachloroethane. In some cases the photochromic polycondensates can even be produced in the form of self-supporting films. The layer or film of photochromic polycondensate is image-wise exposed to actinic light rays while heating the photochromic polycondensate at a temperature corresponding to or slightly above the glass transition temperature of the photochromic polycondensate. After a short exposure the layer or film will be coloured or change colour in the exposed areas. This colour is reversible as is the case generally with all photochromic compounds. It was however completely unexpected that, when the layer or film immediately after formation of the coloured image, is cooled below the glass transition temperature, the coloured image is stabilized as will be clearly demonstrated in the Examples hereinafter.

EXAMPLE 1

A. 5-nitrosalicylaldehyde was obtained upon reaction of salicylaldehyde with nitric acid according to the method described by G. Miller in Chem. Ber., 20, 1928 (1888). This 5-nitrosalicylaldehyde was made to react with chloromethyl-methyl ether according to D. Taylor and B. Davis, J. Org. Chem., 28, 1713 (1963) to form 4-chloromethyl-5-nitro-salicylaldehyde, which was converted into the 4-hydroxymethyl derivative by refluxing the chloromethyl derivative for 3 hours in water. The 4-hydroxymethyl-5-nitro-salicylaldehyde had a melting point of 135°C.

B. 200 g of p-xylene were heated to 130°C, and 392 g of bromine were slowly added dropwise. After cooling to 50°C 100 ml of a mixture of equal volumes of acetone and hexane were added. Upon filtering $\alpha,\alpha'$-dibromoparaxylene was obtained. Melting point: 149°C.

C. 272.5 g of phenylhydrazine were boiled for 1 hour with 260 g of methyl isopropyl ketone in 300 ml of isopropanol. The methylisopropylphenylhydrazone formed was distilled (boiling point/4 mm Hg = 128°C). A mixture of 411 g of the latter compound, 934 ml of absolute isopropanol, and 1457 g of anhydrous zinc chloride was boiled for 8 hours under nitrogen. To this mixture 1.13 liter of water was added whereupon it was allowed to cool.

A precipitate formed, which was decomposed with a 40 % aqueous solution of potassium hydroxide. The oil set free was separated with ether. After drying on sodium sulphate the ether was evaporated. The residue was distilled under reduced pressure to yield 2,3,3-trimethyl-indolenine. Boiling point/27 mm Hg = 127°C.

D. 92.4 g of α,α'-dibromoparaxylene (B) and 111.3 g of 2,3,3-trimethyl-indolenine (C) together with 1.75 liter of methyl ethyl ketone were heated to 90°C whilst stirring for 1 day. After cooling the precipitate was filtered and recrystallized from nitromethane to yield α,α'-bis[2,3,3-trimethyl-3H-indolium-yl(1)]-p-xylene-dibromide. Melting point = 250°–255°C (decomposition).

E. 0.01 mole of the latter product was dissolved in 100 ml of water. After addition of 50 ml of concentrated ammonia the solution was treated with ether and dried on sodium sulphate. The ether was evaporated. After cooling a white precipitate of α,α'-bis[2-methylene-3,3-dimethylindolinyl(1)]-p-xylene formed, which was filtered off. Melting point = 115°C.

F. 0.01 mole of the latter product and 0.02 mole of 4-hydroxymethyl-5-nitro-salicylaldehyde (A) were dissolved in 100 ml of methyl ethyl ketone and the solution was refluxed for 2 hours, whereafter the methyl ethyl ketone was distilled off. A bis-hydroxymethyl photochrome soluble in toluene had formed. It was stirred in the dark. A precipitate formed, which was then recrystallized from dry benzene. The bis-hydroxymethyl photochromic derivative corresponded to the formula

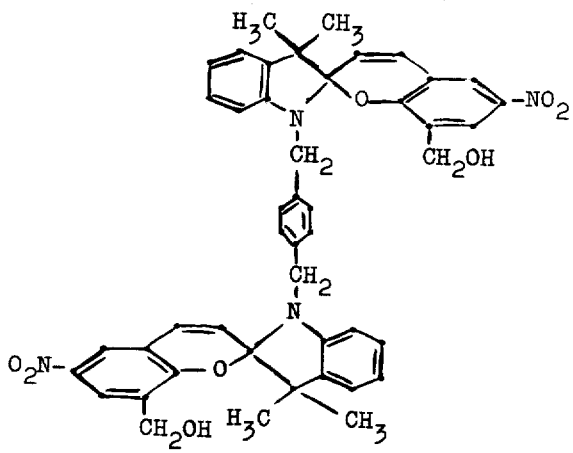

which for easiness' sake is written as follows:
HOCH₂-photochrome-CH₂OH

| Analysis | calculated % | found % |
|---|---|---|
| C | 70.93 | 70.90 |
| H | 5.43 | 5.30 |
| N | 7.19 | 7.20 |
| O | 16.43 | 16.25 |

G. Polycondensation 0.001 mole of the bis-hydroxymethyl photochrome (F) was dissolved in 10 ml of dry methylene chloride and 0.002 mole of triethylamine was added to the solution. This mixture was added dropwise to 0.021 mole of pimelic acid dichloride, whereby the photochrome-bis-acid chloride was formed:

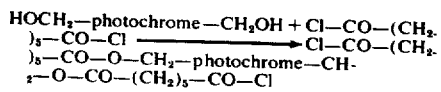

After reaction 10 ml of methylene chloride was again added. 0.02 mole of Bisphenol-A was dissolved in 50 ml of water together with 0.041 mole of sodium hydroxide so that immediately the disodium diphenolate was formed. To this solution were also added 200 mg of triphenyl-methyl-arsonium iodide and 20 ml of methylene chloride. With the solution of the photochrome-di-acid chloride in methylene chloride and the disodium diphenolate dissolved in water an interface polycondensation reaction as described in United Kingdom patent specification No. 891,781 was carried out, whereby a photochromic copolyester dissolved in methylene chloride was formed composed of the following recurring units:

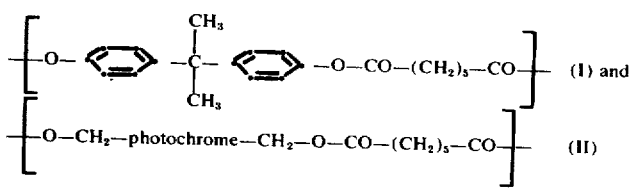

wherein photochrome stands for the photochrome moiety described under (F). The copolyester contained 4.7 mole % of units of formula II and 95.3 mole % of units of formula I and had a molecular weight of 16.000.

The photochromic copolyester had a glass transition temperature of 55°C.

H. Exposure to light

The solution of photochromic copolyester in methylene chloride of (G) was coated on a glass plate in such a way that after evaporation of the methylene chloride a layer of about 65 micron in thickness remained on the glass. This layer was exposed for 5 seconds through a line original by means of an 180 Watt high pressure mercury vapour lamp placed at a distance of about 25 cm. At the exposed areas the photochromic polycondensate took the merocyanine form instead of the spiro form, the colour of the merocyanine form, having an absorption maximum at 575 nm, was clearly perceptible. Depending on the temperature of the photochromic layer the optical density of the exposed places was as follows:

at 33°C : optical density of 0.1
at 40°C : optical density of 0.1
at 45°C : optical density of 0.1
at 50°C : optical density of 0.12
at 52.5°C : optical density of 0.4
at 55°C : optical density of 0.62
at 57°C : optical density of 0.72
at 60°C : optical density of 0.75
at 70°C : optical density of 0.76

This proved that below the glass transition temperature of the photochromic polyester only a very faint colouration took place. Above 50°C the optical density rapidly increased and reached a maximum at about 70°C. Further heating did not increase the optical density anymore. Up to 70°C the photochromic polyester was completely free of thermochromism.

When the different samples were stored the colour faded away in those samples, which were exposed at temperatures below the glass transition temperature of the photochromic polyester. For instance the colour in the sample that was exposed at 33°C and had an optical density of 0.1, had faded away to an optical density of 0.08 after keeping it for 10 hours at the same temperature. On the contrary, the samples exposed above the glass transition temperature, and which after exposure had been cooled immediately to a temperature below the glass transition temperature, remained stable for months.

EXAMPLE 2

The process of Example 1 was repeated with a photochromic polyester obtained upon polycondensation of the same photochromic compound carrying on either side of the photochromic moiety an hydroxymethyl group, with Bisphenol-A, but replacing the dichloride of pimelic acid by a same amount of the dichloride of adipic acid. A photochromic polyester having a glass transition temperature of 75°–80°C was obtained.

After application to a support the layer was exposed as in Example 1 through a line original. The same phenomenon as in Example 1 was observed. Only a faint colouration appeared when it was exposed at a temperature below the glass transition temperature of the photochrome polyester. Above this temperature, however, colouration rapidly increased and the colour obtained was greatly stabilized when the layer after exposure to light was immediately cooled below the glass transition temperature.

We claim:

1. A process for forming stabilized photochromic images, which comprises the steps of:
   1. providing a photographic element having a layer or stratum comprising a photochromic polyester polycondensate containing spiropyran photochromic groups as an integral part of the main polycondensate chain, said photochromic polycondensate having a glass transition temperature lower than 120°C, possessing photochromic properties at or above its glass transition temperature, and being derived from the polycondensation of a photochromic compound carrying a hydroxyalkyl group on either side of said photochromic groups,
   2. image-wise exposing said photographic element at a temperature at least equal to the glass transition temperature of said photochromic polycondensate so as to effect colouration of said photochromic polycondensate in the exposed areas, and
   3. immediately cooling the thus exposed photographic element to a temperature below the glass transition temperature of said photochromic polycondensate so as to stabilize the colouration formed in the exposed areas.

2. A process according to claim 1, wherein the photochromic polycondensate is obtained by copolycondensation of 2,2-bis(4-hydroxyphenyl)-propane and a photochromic compound carrying two hydroxyalkyl groups on either side of the photochromic moiety with a di-acid chloride derived from a di-acid of the saturated dicarboxylic acid group.

3. A process according to claim 2, wherein the di-acid chloride is derived from pimelic acid or adipic acid.

4. A process according to claim 2, wherein the photochromic compound corresponds to the formula:

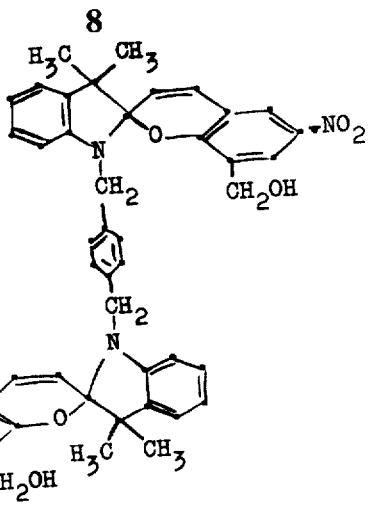

5. A process according to claim 1 wherein the photochromic polycondensate is the polycondensation reaction product of 2,2-bis(4-hydroxyphenyl)-propane and a photochromic compound having a hydroxyalkyl group on each side of the photochromic moiety with a dicarboxylic acid selected from the group consisting of succinic acid, adipic acid, glutaric acid, and pimelic acid.

6. A process according to claim 5 wherein the photochromic compound has the formula:

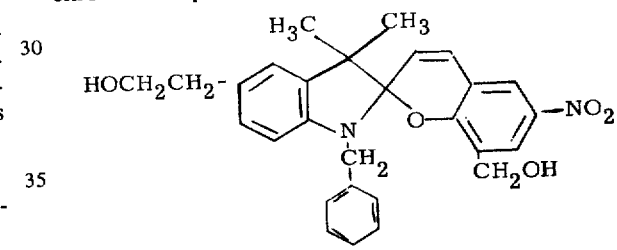

7. A process according to claim 5 wherein the photochromic compound has the formula:

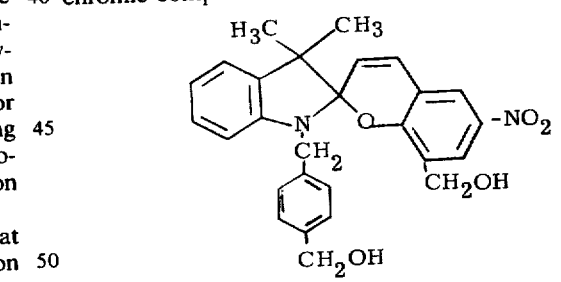

8. A process according to claim 5 wherein the photochromic compound has the formula:

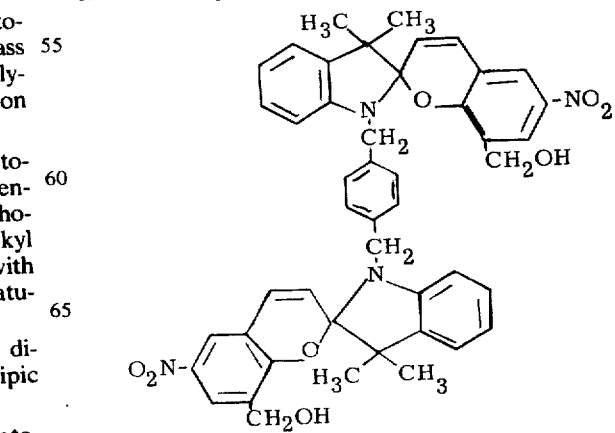

* * * * *